May 23, 1967 O. C. SMITH 3,320,928
APPARATUS AND METHODS FOR AERATING A BODY OF WATER
Filed Oct. 23, 1965 2 Sheets-Sheet 1

INVENTOR:
OSCAR C. SMITH

BY Parrott, Bell, Seltzer, Park & Heard
ATTORNEYS

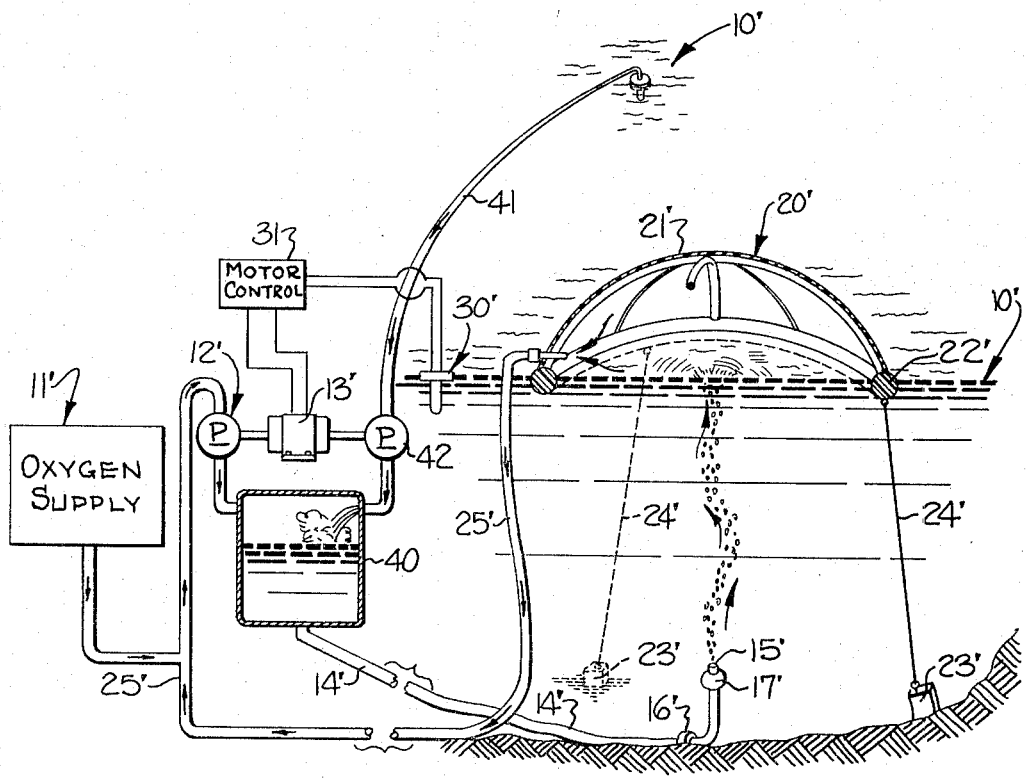

United States Patent Office 3,320,928
Patented May 23, 1967

3,320,928
APPARATUS AND METHODS FOR AERATING
A BODY OF WATER
Oscar Cornelius Smith, Box 207, Newton, N.C. 28658
Filed Oct. 23, 1965, Ser. No. 503,827
15 Claims. (Cl. 119—3)

This invention relates to improved apparatus and methods for aerating a body of water and more particularly to apparatus and methods which reduce the amount of air lost to the atmosphere during the aeration.

In a body of water containing fish or other small animals, such as a lake, pond or small aquarium, air, especially oxygen and other vital gases, becomes dissipated from the body of water which is harmful to the fish or other small animals therein. It is, therefore, often necessary to artificially aerate the body of water, whether it be a large pond, lake or small aquarium, to provide the necessary air including oxygen and/or other vital gases.

Heretofore, various attempts have been made to provide satisfactory apparatus and methods for aerating a body of water for the above-described purpose. However, these prior attempts have all proved somewhat unsatisfactory from a practical standpoint in that they fail to provide an apparatus or method which recirculated the non-absorbed air used for aerating the body of water or which increased the absorption of the air by the water. This resulted in a complete loss into the atmosphere of the non-absorbed oxygen or other gases expelled into the body of water after it had bubbled to the surface thereof and proved costly to the user of the apparatus and method.

It is therefore an object of this invention to provide improved apparatus and methods for satisfactorily aerating a body of water.

It is a more specific object of this invention to provide apparatus and methods for aerating a body of water and for recirculating the air used during the aerating operation.

It is a further specific object of this invention to provide apparatus and methods for aerating a body of water which will allow a greater absorption of the air by the water.

It has been found by this invention that the above objects may be accomplished by providing a supply of the desired air, pumping the air from the air supply by pumping means, conveying the pumped air from the pumping means to generally the bottom of the body of water by first conduit means, expelling the conveyed air into the body of water at a predetermined number of locations in the body of water depending upon the size of the body of water so that the air will bubble up through the body of water to the surface thereof for thoroughly aerating the body of water, collecting the expelled air on the surface of the body of water as the air bubbles up through the water at predetermined locations above the air expelling locations, and conveying the collected air by second conduit means from the collecting means to the pumping means for recirculating the air through the body of water.

It has also been found by this invention that the above objects may be accomplished by a somewhat modified apparatus and method, substantially as set forth above, wherein a supply of water is pumped from the body of water to a mixing chamber disposed between the air supply and the first conduit means to allow the air and water to mix therein under pressure to obtain a greater absorption of the air by the water and followed by conveying the mixture of air and water by the first conduit means to generally the bottom of the body of water where the air and water are expelled into the body of water for aerating the body of water. This modified apparatus and method may or may not require a collection means for collecting and recirculating any excess air bubbling to the surface of the body of water.

It has been further found by this invention that the means for collecting the expelled air on the surface of the body of water provides excellent feeding stations for the fish or other small animals in the body of water to come to the surface of the body of water and feed on the air within the collecting means.

It has also been found that the aerating operation according to this invention will prevent ice from forming on the surface of the body of water when the body of water is subjected to sub-freezing temperatures. It is known that a body of water generally will not freeze below the first foot or so, and that the water near the bottom is generally well above freezing temperatures. Therefore, when the body of water is aerated by expelling air or a mixture of air and water near the bottom thereof, it will cause the warmer water and air to bubble to the surface thereof and thereby prevent the formation of ice on the surface of the body of water.

Some of the objects of the invention having been stated, other objects will appear as the description proceeds when taken in connection with the accompanying drawings, in which—

FIGURE 3 is a schematic, elevational view, partially in section, illustrating a somewhat modified method and apparatus of this invention.

Figure 1:
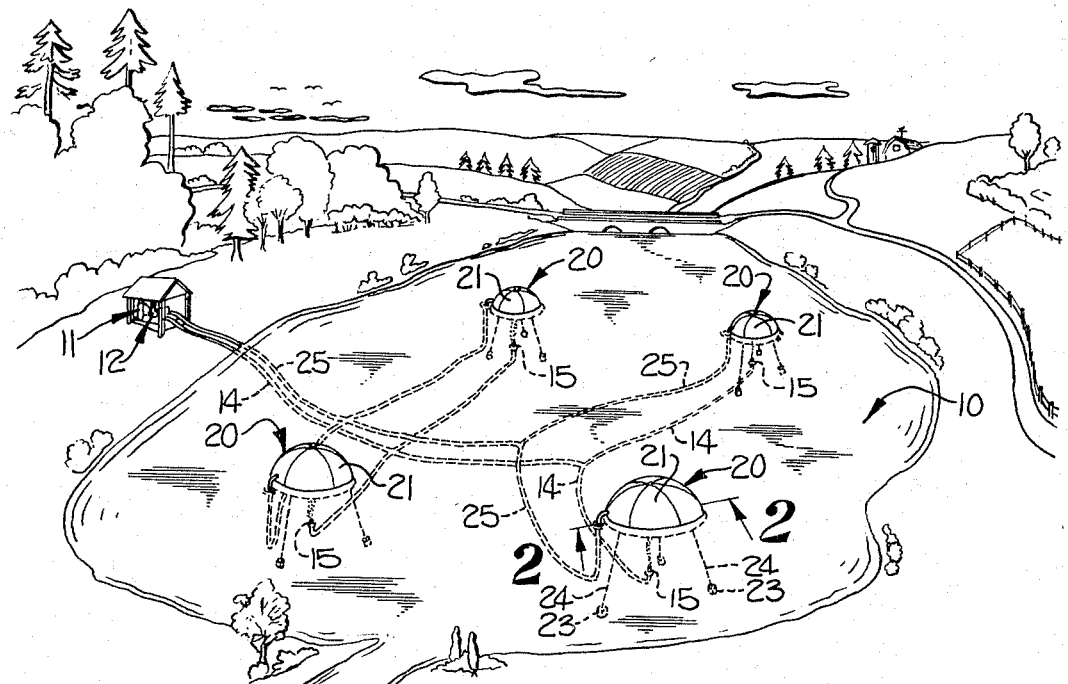
FIGURE 1 is a perspective view of a lake or pond in which the aerating apparatus and method of this invention is utilized.

Referring now to the drawings, it may be seen that the method and apparatus of this invention is illustrated in use with a lake or a pond. However, it is to be understood that the invention is equally as applicable to a small body of water, such as a domestic aquarium or the like.

In the drawings there is shown a body of water 10, which is in the form of a lake or pond. This lake 10 may be aerated by the apparatus and method of this invention, a portion of which is contained within a shed on the shore adjacent the lake and a portion of which is contained in the body of water and on the surface of the body of water. Disposed within the shed on the adjacent shore is an air supply means, generally indicated by the reference numeral 11. This air supplying means could consist of an oxygen supply, as shown schematically in FIGURE 2, or any other type of air or gas supply which might be desired.

Figure 2:
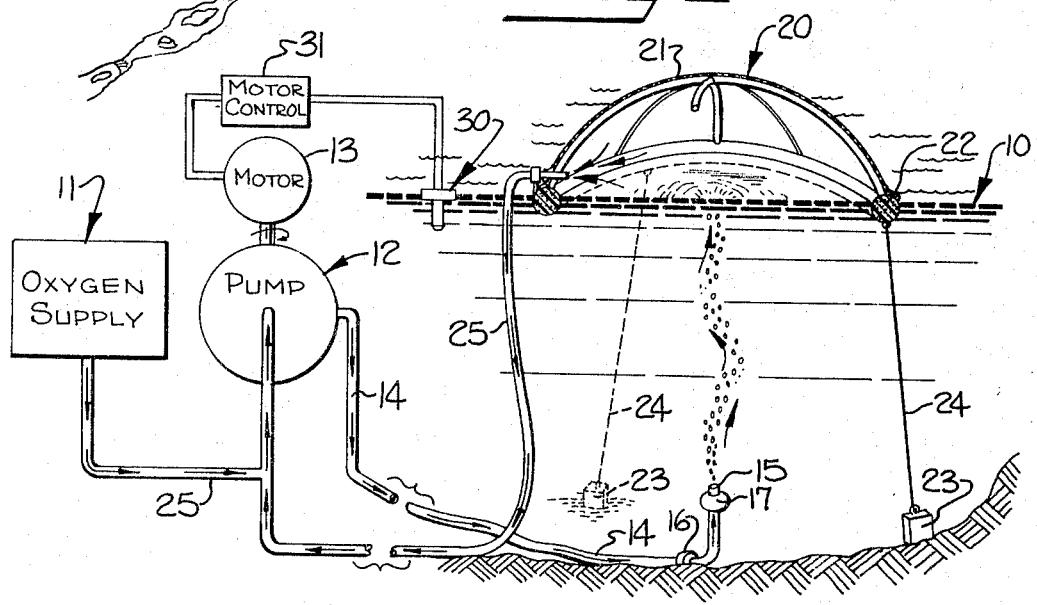
FIGURE 2 is a schematic, elevational view, partially in section, illustrating the aerating method and apparatus of this invention.

Also disposed within the shed on the adjacent shore of the lake 10 is a pump 12 driven by a motor 13, schematically shown in FIGURE 2, and connected with the air supply 11 for receiving and pumping air therefrom.

Leading from the pump 12 to the lake 10 is a first conduit means 14, having one end thereof connected with the pump 12 and extending therefrom to a plurality of spaced open ends 15 disposed on generally the bottom of the lake 10, for receiving and conveying the pumped air from the pump means 12 to the bottom of the body of water so that the air will be expelled therefrom in a plurality of spaced locations to bubble up through the body of water to the surface thereof for aerating the body of water. The number of open ends 15 in the first conduit means 14 is dependent upon the size of the body of water or lake 10 to insure that the body of water is thoroughly aerated. The required number of air expelling locations can be easily determined by one with ordinary skill in the art of aerating a body of water.

The open ends 15 of the first conduit means 14 are maintained in predetermined positions by weight 16 secured thereto. The open ends 15 may also include a float 17 for holding that portion of the first conduit means 14 in a generally vertical plane for expelling the air therefrom into the body of water 10.

The apparatus further includes means for collecting the air expelled from each of the open ends 15 of the first conduit means 14, generally indicated by the reference numeral 20. The collecting means 20 comprises an open, hollow chamber 21 having a ring 22 around the open end thereof constructed of suitable material to adapt the chamber 21 to float on the surface of the body of water with the interior thereof open to and extending above the surface of the water and with the exterior closed to the atmosphere above the surface of the water. The chamber 21 may be constructed of any suitable air impervious material. As may be seen in FIGURE 1, the chambers 21 are located in predetermined positions on the surface of the body of water above the air expelling open ends 15 of the first conduit means 14 to insure collection of the expelled air from each of these open ends 15 as the air bubbles to the surface of the water.

The collecting means 20 also includes means for maintaining the chambers 21 in predetermined positions on the surface of the body of water over the expelling portions of the first conduit means 14 to insure collection of the expelled air as the air bubbles to the surface of the water. As illustrated in FIGURES 1 and 2, this means may comprise weights 23 resting on the bottom of the body of water 10 and connected to the rings 22 of the chambers 21 by lines 24.

These collecting chambers 21 may serve as feeding stations for the fish or other small animals to come to the surface of the water within these chambers to feed on the air collected therein.

The bubbling action of the air from the bottom of the body of water 10 will also serve to carry the warmer water from the bottom to the surface and thereby prevent any appreciable freezing of the surface of the water which might occur when the surface is subjected to sub-freezing temperatures.

The apparatus further includes a second conduit means 25, having portions thereof connected with the interior of each of the chambers 21 and having a portion thereof connected with the pump 12, for receiving and conveying the air from the collecting means 20 to the pump 12 for recirculation of the air through the apparatus and the body of water 10.

The apparatus of FIGURES 1 and 2 may further include a suitable sensing unit, broadly indicated at 30, for sensing the quantity of oxygen or other vital gases in the body of water 10. The sensing unit 30 is connected to a suitable electrical motor control 31, schematically illustrated at FIGURE 2, which is adapted to be actuated by the sensing element 30 to control operation of the motor 13 and thus the pump 12 to stop operation of the pump 12 when the body of water 10 is sufficiently aerated and to allow operation of the pump 12 when the body of water is not sufficiently aerated. The pump 12 would include suitable check valve means therein to prevent the flow of oxygen therethrough when the pump is not operating.

Referring now to FIGURE 3, there is shown a somewhat modified apparatus and method of this invention which is somewhat similar to the apparatus shown in FIGURES 1 and 2 wherein like apparatus will be referred to by primed reference numerals.

There is shown in FIGURE 3, a body of water 10' which may be in the form of a lake, pond, or small aquarium. This body of water 10' may be aerated by apparatus comprising an air supply 11', consisting of an oxygen supply or any other type of air or gas supply which may be desired. A pump 12' is connected to the air supply 11' and is driven by motor 13' for receiving and pumping air therefrom.

The pump 12' is connected with a mixing chamber 40 to pump air under pressure therein from the air supply 11'. This embodiment includes a conduit means 41 having one end thereof connected with the mixing chamber 40 and the other end thereof disposed in a remote part of the body of water 10'. The conduit means 41 also includes a pump 42 driven by the motor 13' so that the conduit means 41 will receive and convey water from the body of water 10' to the mixing chamber 40 to allow the water to mix with the air supplied to the mixing chamber 40 under pressure to obtain a greater absorption of the air by the water.

From the mixing chamber 40 the mixture of air and water is conveyed by a conduit means 14' to a plurality of spaced open ends 15' disposed on generally the bottom of the body of water 10' so that the mixture of air and water will be expelled therefrom in a plurality of spaced locations to aerate the body of water.

The number of open ends 15' in the conduit means 14' is dependent upon the size of the body of water 10' to insure that the body of water is thoroughly aerated, as is set forth above in connection with the apparatus of FIGURES 1 and 2.

The open ends 15' of the conduit means 14' are maintained in predetermined positions by weights 16' secured thereto. The open ends 15' may also include a float 17' for holding that portion of the conduit means 14' in a generally vertical plane for expelling the mixture of air and water therefrom into the body of water 10'.

This apparatus may or may not include means for collecting the excess air expelled from each of the open ends 15' of the conduit means 14', which is illustrated in FIGURE 3 and generally indicated by the reference numeral 20'. The requirement for this collecting means would be dependent on the amount of excess air which is not absorbed by the water and the desirability of collecting and recirculating the excess air. As set forth above in connection with the apparatus of FIGURES 1 and 2, if utilized, this collecting means would comprise open, hollow chambers 21' having a ring 22' around the open end thereof constructed of suitable material to adapt the chamber 21' to float on the surface of the body of water with the interior thereof open to and extending above the surface of the water and with the exterior thereof closed to the atmosphere above the surface of the water. The chamber 21' may also be constructed of any suitable air impervious material. The chambers 21' are located in predetermined positions on the surface of the body of water above the air and water expelling open ends 15' of the conduit means 14' to insure collection of the excess air expelled from each of these open ends 15' as the excess air bubbles to the surface of the water.

This collecting means 20' may also include means for maintaining the chambers 21' in predetermined positions on the surface of the body of water over the expelling portions of the conduit means 14' to insure collection of the excess expelled air not absorbed by the water as the air bubbles to the surface of the water. This means may comprise weights 23' resting on the bottom of the body of water 10' and connected to the rings 22' of the chambers 21' by lines 24'.

These collecting chambers 21' may also serve as feeding stations for the fish or other small animals to come to the surface of the water within these chambers to feed on the excess air collected therein.

The bubbling action of the excess air from the bottom of the body of water 10' will also serve to carry the warmer water from the bottom to the surface and thereby preventing any appreciable freezing of the surface of the water which might occur when the surface is subjected to sub-freezing temperatures.

This apparatus may also further include conduit means 25', having portions thereof connected with the interior of each of the chambers 21' and having a portion thereof connected with the pump 12′, for receiving and conveying the excess air from the collecting means 20′ to the pump 12′ for recirculation of the excess air through the apparatus and the body of water 10′.

This apparatus of FIGURE 3 may also include a suitable sensing unit 30′ for sensing the quantity of oxygen or other vital gases in the body of water 10′. The sensing unit 30′ is connected to a suitable electrical motor control 31′, schematically illustrated at FIGURE 3, which is adapted to be actuated by the sensing element 30′ to control operation of the motor 13′ and thus the pumps 12′ and 42 to stop operation of the pumps 12′ and 42 when the body of water 10′ is sufficiently aerated and to allow operation of the pumps 12′ and 42 when the body of water is not sufficently aerated. The pumps 12′ and 42 would include suitable check valve means therein to prevent the flow of oxygen and water therethrough when the pumps are not operating.

This invention has, therefore, provided methods and apparatus for satisfactorily aerating a body of water with any desired type of air and which will collect and recirculate the air to eliminate the loss of the air utilized in the process.

In the drawings and specification there have been set forth preferred embodiments of the invention and, although specific terms are employed, they are used in a generic and descriptive sense only and not for purposes of limitation, the scope of the invention being defined in the claims.

What is claimed is:

1. Recirculating apparatus for aerating a body of water serving as a habitat for aquatic life comprising:
    (a) means for supplying air;
    (b) pump means connected with said air supply means for receiving and pumping air therefrom;
    (c) first conduit means connected with said pump means and extending therefrom to generally the bottom of the body of water for receiving and conveying the air from said pump means to the bottom of the body of water so that the air will be expelled therefrom to bubble up through the body of water to the surface thereof for aerating the body of water;
    (d) means disposed on the surface of the body of water for collecting the air expelled from said first conduit means as the air bubbles to the surface of the body of water; and
    (e) second conduit means connected with said collecting means and with said pump means for receiving and conveying air from said collecting means to said pump means for recirculating the air through the apparatus and the body of water.

2. Recirculating apparatus for aerating a body of water, as set forth in claim 1, in which said first conduit means has a plurality of spaced open ends disposed on generally the bottom of the body of water for expelling air therefrom in a plurality of locations, and in which said collecting means comprises a plurality of collecting means disposed above each of the air expelling locations, the number of air expelling open ends on said first conduit means and the number of collecting means being dependent upon the size of the body of water so that the body of water will be thoroughly aerated.

3. Recirculating apparatus for aerating a body of water, as set forth in claim 1, in which said collecting means comprises an open, hollow chamber adapted to float on the surface of the body of water with the interior thereof open to and extending above the surface of the water and with the exterior thereof closed to the atmosphere above the surface of the water.

4. Recirculating apparatus for aerating a body of water, as set forth in claim 1, including:
    (f) means for maintaining the air expelling portion of said first conduit means in a predetermined position on the bottom of the body of water for expelling air at a predetermined location in the body of water; and
    (g) means for maintaining said collection means in a predetermined position on the surface of the body of water over the expelling portion of said first conduit means to insure collection of the expelled air as the air bubbles to the surface of the water.

5. Recirculating apparatus for aerating a body of water serving as a habitat for aquatic life comprising:
    (a) means for supplying air;
    (b) pump means connected with said air supply means for receiving and pumping air therefrom;
    (c) first conduit means connected with said pump means and extending therefrom to generally the bottom of the body of water for receiving and conveying air from said pump means to the bottom of the body of water so that the air will be expelled therefrom to bubble up through the body of water to the surface thereof for aerating the body of water;
    (d) means disposed on the surface of the body of water for collecting the air expelled from said conduit means as the air bubbles to the surface of the body of water, said collecting means comprising an open, hollow chamber adapted to float on the surface of the body of water with the interior thereof open to and extending above the surface of the water and with the exterior thereof closed to the atmosphere above the surface of the water;
    (e) second conduit means connected with said collecting means and with said pump means for receiving and conveying air from said collecting means to said pump means for recirculating the air through the apparatus and the body of water;
    (f) means for maintaining the air expelling portion of said first conduit means in a predetermined position on the bottom of the body of water for expelling air in a predetermined position in the body of water; and
    (g) means for maintaining said collection means in a predetermined position on the surface of the body of water over the expelling portion of said first conduit means to insure collection of the expelled air as the air bubbles to the surface of the water.

6. Recirculating apparatus for aerating a body of water serving as a habitat for aquatic life comprising:
    (a) means for supplying air;
    (b) a pump means connected with said air supply means for receiving and pumping air therefrom;
    (c) first conduit means having one end thereof connected with said pump means and extending therefrom to a plurality of spaced open ends disposed on generally the bottom of the body of water for receiving and conveying air from said pump means to the bottom of the body of water so that the air will be expelled therefrom in a plurality of spaced locations to bubble up through the body of water to the surface thereof for aerating the body of water;
    (d) a plurality of means disposed on the surface of the body of water above each of the air expelling locations for collecting the air expelled from said first conduit means as the air bubbles to the surface of the body of water, said collecting means each comprising an open, hollow chamber adapted to float on the surface of the body of water with the interior thereof open to and extending above the surface of the water and with the exterior thereof closed to the atmosphere above the surface of the water;
    (e) second conduit means connected with each of said collecting means and with said pump means for receiving and conveying air from said collecting means to said pump means for recirculating the air through the apparatus and the body of water;
    (f) means for maintaining the air expelling portions of said first conduit means in predetermined positions on the bottom of the body of water for expelling air at predetermined locations in the body of water; and
    (g) means for maintaining each of said collection means in predetermined positions on the surface of the body of water over each of the expelling portions of said first conduit means to insure collection of the expelled air as the air bubbles to the surface of the water.

7. Recirculating apparatus for aerating a body of water serving as a habitat for aquatic life comprising:
(a) means for supplying air;
(b) a first pump means connected with said air supply means for receiving and pumping the air under pressure therefrom;
(c) a first conduit means having one end disposed in the body of water for receiving and conveying water therethrough;
(d) a second pump means connected with said first conduit for receiving and pumping water therefrom;
(e) a mixing chamber connected to said first and second pump means for receiving and mixing water and air under pressure therein to obtain a greater absorption of the air by the water;
(f) second conduit means connected with said mixing chamber and extending therefrom to generally the bottom of the body of water for receiving and conveying the mixture of air and water from said mixing chamber to the bottom of the body of water so that the air and water will be expelled therefrom and the excess air to bubble up through the body of water to the surface thereof for aerating the body of water;
(g) means disposed on the surface of the body of water for collecting the excess air expelled from said second conduit means as the air bubbles to the surface of the body of water; and
(h) third conduit means connected with said collecting means and with said first pump means for receiving and conveying the excess air from said collecting means to said first pump means for recirculating the air through the apparatus and the body of water.

8. Recirculating apparatus for aerating a body of water serving as a habitat for aquatic life comprising:
(a) means for supplying air;
(b) a first pump means connected with said air supply means for receiving and pumping the air under pressure therefrom;
(c) a first conduit means having one end disposed in the body of water for receiving and conveying water therethrough;
(d) a second pump means connected with said first conduit means for reveiving and pumping water therefrom;
(e) a mixing chamber connected to said first and second pump means for receiving and mixing water and air under pressure therein to obtain a greater absorption of the air by the water;
(f) second conduit means connected with said mixing chamber and extending therefrom to generally the bottom of the body of water for receiving and conveying the mixture of water and air from said mixing chamber to the bottom of the body of water so that the air and water will be expelled therefrom and the excess air will bubble up through the body of water to the surface thereof for aerating the body of water;
(g) means disposed on the surface of the body of water for collecting the air expelled from said second conduit means as the excess air bubbles to the surface of the body of water, said collecting means comprising an open, hollow chamber adapted to float on the surface of the body of water with the interior thereof open to and extending above the surface of the water and with the exterior thereof closed to the atmosphere above the surface of the water;
(h) third conduit means connected with said collecting means and with said first pump means receiving and conveying the excess air from said collecting means to said first pump means for recirculating the air through the apparatus and the body of water;
(i) means for maintaining the expelling portion of said second conduit means in a predetermined position on the bottom of the body of water for expelling the mixture of air and water in a predetermined location in the body of water; and
(j) means for maintaining said collection means in a predetermined position on the surface of the body of water over the expelling portion of said second conduit means to insure collection of the expelled excess air as the air bubbles to the surface of the water.

9. Recirculating apparatus for aerating a body of water serving as a habitat for aquatic life comprising:
(a) means for supplying air;
(b) a first pump means connected with said air supply means for receiving and pumping the air under pressure therefrom;
(c) a first conduit means having one end disposed in the body of water for receiving and conveying water therethrough;
(d) a second pump means connected with said first conduit means for receiving and pumping water therefrom;
(e) a mixing chamber connected to said first and second pump means for receiving and mixing water and air under pressure therein to obtain a greater absorption of the air by the water;
(f) second conduit means having one end thereof connected with said mixing chamber and extending therefrom to a plurality of spaced, open ends disposed on generally the bottom of the body of water for receiving and conveying the mixture of air and water from said mixing chamber to the bottom of the body of water so that the air and water will be expelled therefrom in a plurality of spaced locations and the excess air will bubble up through the body of water to the surface thereof for aerating the body of water;
(g) a plurality of means disposed on the surface of the body of water above each of the expelling locations for collecting the excess air expelled from said second conduit means as the air bubbles to the surface of the body of water, said collecting means each comprising an open, hollow chamber adapted to float on the surface of the body of water with the interior thereof open to and extending above the surface of the water and with the exterior thereof closed to the atmosphere above the surface of the water;
(h) third conduit means connected with each of said collecting means and with said first pump means for receiving and conveying the excess air from said collecting means to said first pump means for recirculating the air thorugh the apparatus and the body of water;
(i) means for maintaining the air expelling portion of said second conduit means in predetermined positions on the bottom of the body of water for expelling air and water at predetermined locations in the body of water; and
(j) means for maintaining each of said collecting means in predetermined positions on the surface of the body of water over each of the expelling portions of said second conduit means to insure collection of the expelled excess air as the air bubbles to the surface of the water.

10. A method of aerating a body of water serving as a habitat for aquatic life comprising the steps of:
(a) providing a supply of air;
(b) pumping the air from the air supply by a pumping means;
(c) conveying the pumped air from the pumping means to generally the bottom of the body of water;
(d) expelling the conveyed air into the body of water so that the air will bubble up through the body of water to the surface thereof for aerating the body of water;
(e) collecting the expelled air in a collecting means on the surface of the body of water as the air bubbles up through the water; and (f) conveying the collected air from the collecting means to the pumping means for recirculating the air through the body of water.

11. A method of aerating a body of water, as set forth in claim 10, in which said expelling step comprises expelling the conveyed air into the body of water at a plurality of locations depending upon the size of the body of water so that the body of water will be thoroughly aerated, and in which said collecting step comprises collecting the expelled air above each of the expelling locations in a plurality of collecting means.

12. A method of aerating a body of water, as set forth in claim 10, in which said expelling step includes expelling the air at a predetermined location in the body of water, and in which said collecting step includes collecting the expelled air at a predetermined location in a collecting means above the predetermined location at which the air is expelled to insure collection of the expelled air as the air bubbles to the surface of the water.

13. A method of aerating a body of water serving as a habitat for aquatic life comprising the steps of:
    (a) providing a supply of air;
    (b) pumping the air from the air supply by a pumping means;
    (c) conveying the pumped air from the pumping means to generally the bottom of the body of water;
    (d) expelling the conveyed air into the body of water at a plurality of predetermined locations in the body of water depending upon the size of the body of water so that the air will bubble up through the body of water to the surface thereof for thoroughly aerating the body of water;
    (e) collecting the expelled air on the surface of the body of water as the air bubbles up through the water at a plurality of predetermined locations above the predetermined locations at which the air is expelled in a pluarality of collecting means to insure the collection of the expelled air as the air bubbles to the surface of the water; and
    (f) conveying the collected air from the collecting means to the pumping means for recirculating the air through the body of water.

14. A method of aerating a body of water serving as a habitat for aquatic life comprising the steps of:
    (a) providing a supply of air;
    (b) pumping the air from the air supply under pressure to a chamber;
    (c) pumping water from the body of water to the chamer;
    (d) mixing the air and water in the chamber under pressure to obtain a greater absorption of the air by the water;
    (e) conveying the mixed air and water from the chamber to generally the bottom of the body of water;
    (f) expelling the conveyed air and water into the body of water so that the excess air will bubble up through the body of water to the surface thereof for aerating the body of water;
    (g) collecting the expelled excess air in a collecting means on the surface of the body of water as the excess air bubbles up through the water; and
    (h) conveying the collected air from the collecting means to the pumping means for recirculating the air through the body of water.

15. A method of aerating a body of water serving as a habitat for aquatic life comprising the steps of:
    (a) providing a supply of air;
    (b) pumping the air from the air supply under pressure to a chamber;
    (c) pumping water from the body of water to the chamber;
    (d) mixing the air and water in the chamber under pressure to obtain a greater absorption of the air by the water;
    (e) conveying the mixed air and water from the chamber to generally the bottom of the body of water;
    (f) expelling the conveyed air and water into the body of water at a plurality of predetermined locations in the body of water depending upon the size of the body of water so that the excess air will bubble up the body of water to the surface thereof for thoroughly aerating the body of water;
    (g) collecting the excess expelled air on the surface of the body of water as the air bubbles up through the water at a plurality of predetermined locations above the predetermined location which the air and water are expelled in a plurality of collecting means to insure collection of the expelled air as the air bubbles to the surface of the water; and
    (h) conveying the collected excess air from the collecting means to the pumping means for recirculating the air through the body of water.

References Cited by the Examiner
UNITED STATES PATENTS

| | | | |
|---|---|---|---|
| 1,643,273 | 9/1927 | Imhoff | 119—3 X |
| 2,820,548 | 1/1958 | Marcus et al. | 210—169 |
| 2,824,728 | 2/1958 | Crawford | 119—5 X |
| 2,995,497 | 8/1961 | Heden | 261—121 X |
| 3,057,094 | 10/1962 | Winkelman | 119—5 X |
| 3,101,564 | 8/1963 | Stoessel | 119—5 X |
| 3,109,288 | 11/1963 | Gross | 61—1 |
| 3,151,069 | 9/1964 | Halpert | 210—169 |

SAMUEL KOREN, *Primary Examiner.*

ALDRICH F. MEDBERY, *Examiner.*